United States Patent [19]

Svirklys

[11] 4,198,034
[45] Apr. 15, 1980

[54] FENCE STRUCTURE

[75] Inventor: Ferdinand M. Svirklys, Toronto, Canada

[73] Assignee: Extrados Company Limited, Toronto, Canada

[21] Appl. No.: 862,333

[22] Filed: Dec. 20, 1977

Related U.S. Application Data

[60] Division of Ser. No. 710,236, Jul. 30, 1976, Pat. No. 4,077,334, and a continuation-in-part of Ser. No. 579,410, May 21, 1975, Pat. No. 3,971,326.

[51] Int. Cl.² ............................................. E04H 17/14
[52] U.S. Cl. ........................................ 256/65; 403/252
[58] Field of Search ................. 256/22, 21, 24, 65, 256/72, 59; 403/252, 346; 211/190, 191, 192

[56] References Cited

U.S. PATENT DOCUMENTS

| | | | |
|---|---|---|---|
| 2,642,269 | 6/1953 | Daniel | 256/21 |
| 2,809,017 | 10/1957 | Fou Wong | 256/24 X |
| 2,825,537 | 3/1958 | Wolfe et al. | 256/22 |
| 3,303,622 | 2/1967 | Minds, Jr. | 256/24 X |
| 3,318,462 | 5/1967 | Spiegl et al. | 211/190 |
| 3,358,848 | 12/1967 | Johnsson | 211/190 |
| 3,601,432 | 8/1971 | Christensen et al. | 403/252 |
| 3,914,913 | 10/1975 | Roberts | 52/579 X |

FOREIGN PATENT DOCUMENTS

443873   2/1968   Switzerland ............................ 211/191

*Primary Examiner*—Andrew V. Kundrat
*Attorney, Agent, or Firm*—Sim & McBurney

[57] ABSTRACT

A knock-down pallet is constructed of a plurality of releasably interlocking aluminum members of one of two types. A unique fastening device is used to achieve, in simple manner without special tools or skill, the interlocking of a plurality of spaced-parallel deck-forming members to two, three or more spaced and parallel stringer members of rectangular cross-section to provide a one- or two-deck two-way or four-way pallet construction. A stop means prevents longitudinal movement of the deck members transverse of the stringer members. A fence structure formed of similar releasably interlocking members also is described.

18 Claims, 18 Drawing Figures

FENCE STRUCTURE

REFERENCE TO RELATED APPLICATION

This is a division of application Ser. No. 710,236 filed July 30, 1976 and now Pat. No. 4,077,334.

This application is a continuation-in-part of U.S. application Ser. No. 579,410 filed May 21, 1975 (now U.S. Pat. No. 3,971,326).

FIELD OF INVENTION

This invention relates to constructions formed of releasably interlockable members, particularly pallets and fences.

BACKGROUND OF THE INVENTION

Pallets for warehousing use and material handling typically have been constructed of wood and provided in a permanent structure. Pallets generally have one or two decks and are provided in 2-way entry or 4-way entry types.

Wooden pallets although used almost universally in material handling suffer from considerable drawbacks. In view of the permanence of the structure, wooden pallets occupy considerable storage area during shipping from the manufacturer to the consumer and when not in use. Wooden pallets cannot be stored out-of-doors as moisture is readily absorbed, increasing its weight, altering its dimension, promoting fungal and bacterial growth, and leading to degradation of the material on prolonged exposure. The bulk size and the necessity to store wooden pallets in a sheltered area gives rise to considerable shipping and storage costs.

Further, wooden pallets typically are quite heavy and can be used only with considerable difficulty in certain industries, such as the food industry, in which cleanliness and corrosion resistance are essential. Effective sterilization of wooden pallets is extremely difficult.

Construction of pallets from wood constitutes a potential fire hazard due to the ready flammability of wood.

Damaged wooden pallets generally are not repairable and represent a considerable disposal problem. Reclamation of the wood generally is not practical or feasible due to the various nails, screws or other fasteners used in the construction and the damaged pallets have to be disposed of by burning or as land-fill. The former manner of disposal generally is impractical, due to air pollution control requirements, and the latter manner is expensive, both in terms of haulage costs to a suitable dump and space occupied at the land-fill.

Further, wooden pallets generally are not readily color-keyed for various uses, since suitable paints for this purpose either lack the strength to withstand extensive use and hence are easily removed during use of the pallets, or are so expensive as to be prohibitive.

In view of these difficulties, attempts have been made to use other construction materials for the provision of pallets, typically plastics. However, plastic pallets suffer from several drawbacks, such as, the plastic materials involved are quite expensive, the pallets must be molded as a single unit again giving rise to a bulk size problem, a minor crack in the structure is sufficient to seriously impair the strength of the pallet, the pallets are severely affected by extremes of temperature, the plastic generally is degraded by exposure to sunlight, and damaged pallets are difficult to dispose of economically.

SUMMARY OF THE INVENTION

The present invention seeks to overcome the prior art difficulties of pallet constructions. In accordance with the present invention, a pallet is constructed wholly of aluminum in an assemblable and disassemblable form. The pallet is formed only from a plurality of one type of member and a plurality of a second type of member, the types of member being interlocked by a unique locking structure. The interlocking of the two types of member to provide the pallet and the disassembly of the interlock are achievable without the necessity for any special tools or skills.

DESCRIPTION OF PREFERRED EMBODIMENTS

Figure 1:
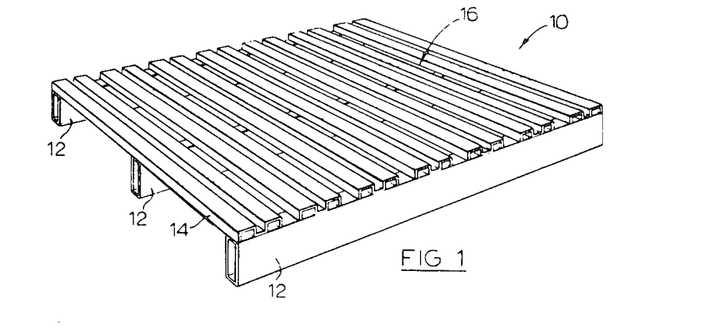
FIG. 1 is a perspective view of a single deck two-way pallet construction provided in accordance with the invention.
Figure 2:
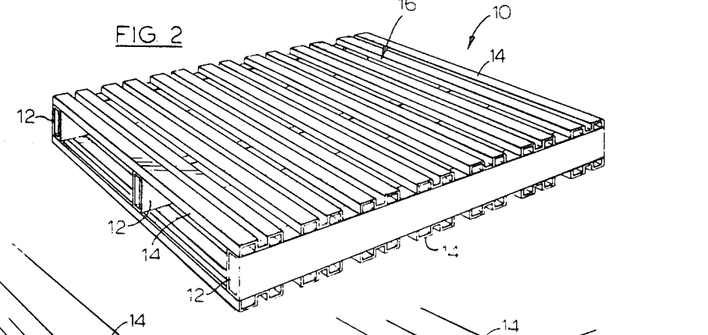
FIG. 2 is a perspective view of a two-deck two-way pallet construction provided in accordance with the invention.
Figure 3:
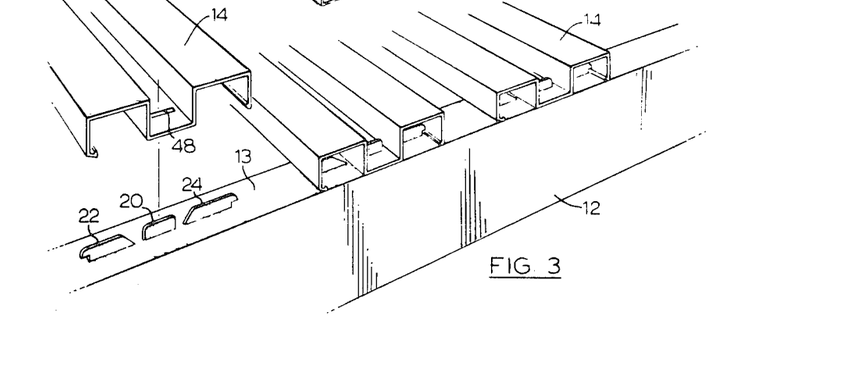
FIG. 3 is a close up view of one side of the pallet of FIG. 1, partly exploded, showing the interlocking of the pallet-forming members.

Referring to the drawings, FIGS. 1 and 2 illustrate single- and double-deck one-way entry pallet constructions respectively which utilize basically the same units and assembly principle, with the exception of modifications required to provide a single- or double-deck construction.

A pallet 10 constructed of aluminum parts includes three hollow elongate members or stringer elements 12 of rectangular cross section and arranged with their longer dimension upright so that the outer surface 13 of the shorter dimension provides a supporting surface. The rectangularly cross-sectioned members 12 are arranged parallel to each other.

While the pallet of FIGS. 1 and 2 is illustrated as having three elongate members or stringer elements 12, this number is not essential but rather is preferred. Two or four or more such elements 12 may be used, depending on the size and strength of pallet desired.

A plurality of deck-forming elongate extrusions 14 are supported on the outer surfaces 13 and are releasably connected to the rectangularly cross sectioned members 12 in spaced parallel relation generally perpendicular to the rectangularly cross-sectioned member 12 and cooperate to provide a deck 16 on one side only or on both sides of the pallet 10, depending on the type desired.

The deck-forming members 14 are releasably connected to the rectangularly cross-sectioned members 12 in such a manner as to prevent movement of the deck-forming members 14 longitudinally thereof and laterally to the rectangularly cross-sectioned members 12, in a manner described in more detail below, so that the structure is stable.

Each rectangularly cross-sectioned member 12 includes a plurality of sets of protrusions 18, extending either from the top outer surface 13 only, in the case of the pallet construction of FIG. 1 or from the top and bottom outer surfaces 13, in case of the pallet construction of FIG. 2. The longitudinal dimension of each set of protrusions 18 is substantially equal to the width of each deck-forming member 14.

The number of the sets of protrusions 18 is equal to the number of deck-forming members 14 to be attached to the rectangularly cross-sectioned member 12 and the number is the same for each of the rectangularly cross-sectioned members 12.

The spacing apart of the sets of protrusions 18 from each other on the surface 13 of the rectangularly cross-sectioned member 12 may vary widely, depending on the spacing desired between the deck-forming extrusions in the pallet 10, which in turn is dependent on the desired end use and desired strength of the pallet 10.

Each of the sets of protrusions 18 includes a central member 20, a left hand member 22 and a right hand member 24. Each member of the set 18 extends upwardly generally perpendicular to the surface 13 and extends in straight line alignment with the other members of the set and with the members in other sets longitudinally of the surface 13. Each member is thin laterally.

The left and right hand member 22 and 24, which have mirror-image shapes, are undercut at their ends remote from the central member 20 to define shoulders 26 and 28 respectively and undercuts 30 and 32 respectively.

In FIGS. 1 to 11, a single set of protrusions 18 for each intersection is illustrated upstanding from surface 13. For improved pallet strength, two sets of such protrusions 18 may be provided for each intersection, as shown in FIGS. 12 and 13, the sets being provided one adjacent each longitudinal edge of the surface 13.

Each of the deck-forming members 14 includes first and second elongate parallel coplanar elements 34 and 36 intended to cooperate with the elements 34 and 36 of the other deck-forming members 14 to define a planar load-supporting surface.

The coplanar elements 34 and 36 are joined by an integral member defining a channel 40 therebetween and including a first elongate portion 42 situated in a plane parallel to the plane of the coplanar elements 34 and 36 are intended to engage the outer surface 13 of the rectangularly cross-sectioned element 12 and first and second upright elements 44 and 46 integrally joining the elongate portion 42 and the coplanar elements 34 and 36.

The elongate portion 42 has three slots 48 formed therethrough of length and dimension sufficient to receive the central member or tab 20 of each set of protrusions therethrough.

Three slots 48 are used corresponding to the three rectangularly cross-sectioned members 12 used to form the pallet constructions of FIGS. 1 and 2 and the central slot is spaced equally from the two ends. Where two or more than three such rectangularly cross-sectioned members 12 are used, then the corresponding number of slots 48 may be provided.

The slots 48 adjacent the ends of each member 14 are spaced inwardly a distance corresponding to the distance of the tabs 20 from the edge of the surface 13, so that, when the pallet is assembled, the ends of the deck-forming members are flush with the outer surfaces of the rectangularly cross-sectioned element 12, as illustrated in FIGS. 1 and 2.

If desired, the end slots 48 may be positioned a further distance from the ends of the member 14, so that the assembled pallet has the outer rectangularly cross-sectioned elements 12 recessed with the deck or decks 16 overhanging the outer elements 12.

The deck-forming elements 14 also include integral skirt portions 50 and 52 depending from the coplanar elements 34 and 36 generally perpendicularly thereto at the sides of the deck-forming elements 14. The skirt portions 50 and 52 extend a distance substantially equal to the depth of the channel 40.

At the lower end of each skirt portion 50 and 52 is a shoulder-engaging member 54 and 56 respectively.

Each shoulder-engaging member includes a portion projecting inwardly of the skirt 50 and 52 towards the first elongate portion 42 and a shoulder-face-engaging portion. Generally shoulder-engaging member 54 projects inwardly in greater distance than shoulder-engaging member 56 and a distance substantially equal to the depth of the undercut 30.

Figure 6:
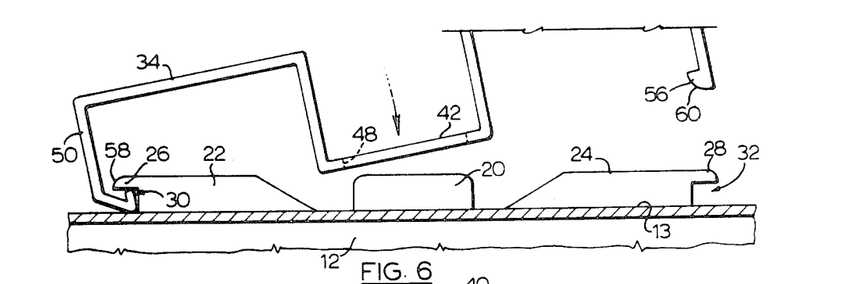
FIGS. 6 and 7 are views of the interlocking of the members to form the pallet construction of FIGS. 1 and 2.
Figure 7:
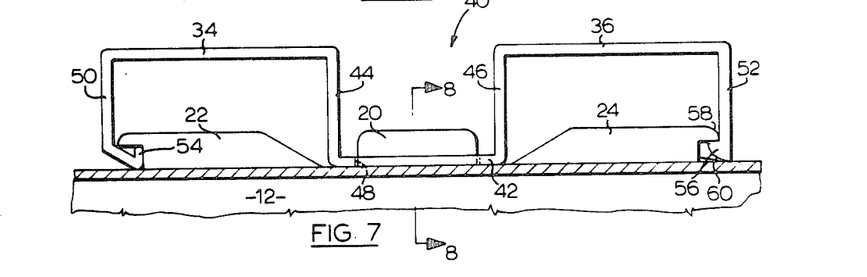
Figure 8:
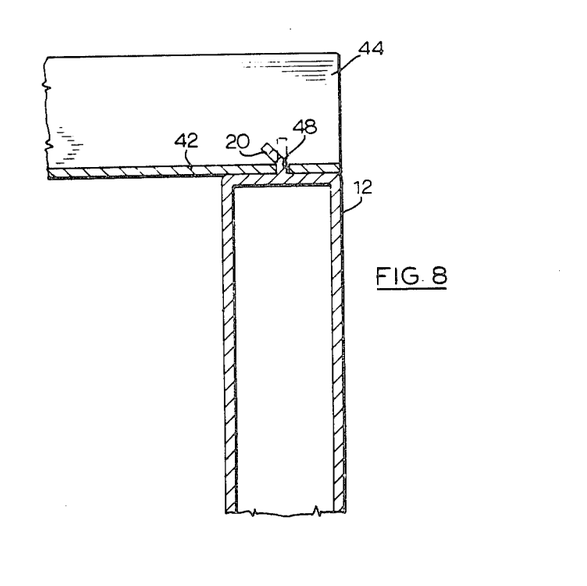
FIG. 8 is a sectional view of part of the interlock taken on line 8—8 of FIG. 7 in a permanently-locked position; p

While the undercuts 30 and 32 have the same dimensions and depth approximately equal to the extremity of the shoulder-engaging member 54, this arrangement is for convenience in assembly of the pallet, allowing the longer shoulder-engaging member 54 to be inserted in either undercut to engage both the shoulder and the end wall of the undercut, so that the arrangement shown in FIGS. 6 and 7 with respect to the relative positions of shoulder-engaging members 54 and 56 and undercuts 30 and 32 may be reversed. Further, not all the extrusions 14 need to be connected to extrusions 12 by the illustrated arrangement.

However, if desired, the undercuts 30 and 32 may be dimensioned such that undercut 30 has a depth at least equal to the maximum distance of extension of the shoulder engaging member 54 and the undercut 32 has a lower depth at least equal to the maximum distance of extension of the shoulder-engaging member 54 and less than the maximum distance of extension of the shoulder-engaging member 56.

Each shoulder 26 and 28 has a sloping outer surface 58. The surface of the shoulder-engaging member 56 intended to engage the sloping surface 58 during assembly, as described below, is also curved at 60.

Where it is desired to provide a pallet deck which does not possess channels 40, then the deck-forming members 14 may be provided in the modified form illustrated in FIG. 13.

As seen therein, the deck-forming member 14 has a continuous planar surface 100 which cooperates with other like surfaces to provide the deck surface. Integral skirt portions 50 and 52 with associated shoulder-engaging members 54 and 56 are provided depending from the lateral extremities of the planar surface 100.

A pair of webs 102 depend from the planar surface 100 parallel to the skirt portions 50 and 52 for engagement with the surface 13 of the rectangular cross-sectioned member 13. One only such web 102 may be used, if desired, although it is preferred to provide the pair of such webs for strength and stability. Greater numbers of such webs 102 may be used, if desired.

Slots 104 are provided in each of the webs 102 for receiving the central member 20 of each of the set of protrusions 18 to prevent longitudinal displacement of the deck-forming members 14 relative to the rectangularly cross-sectioned elements 12 in an assembled pallet, in analogous manner to the projection of the central member 20 through the slots 48.

Figure 4:
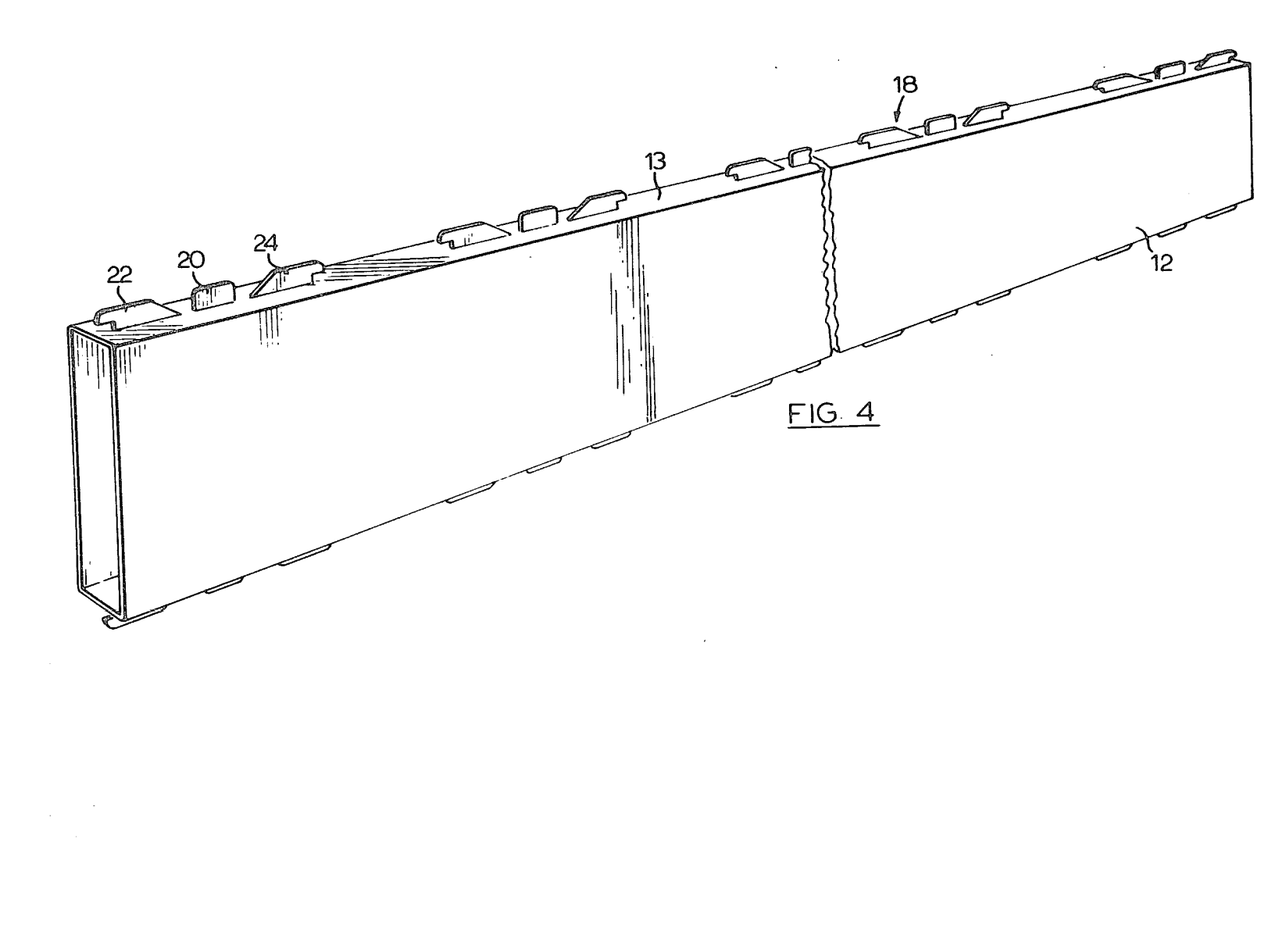
FIG. 4 is a perspective view of one element used in the pallet construction of FIG. 2.
Figure 5:
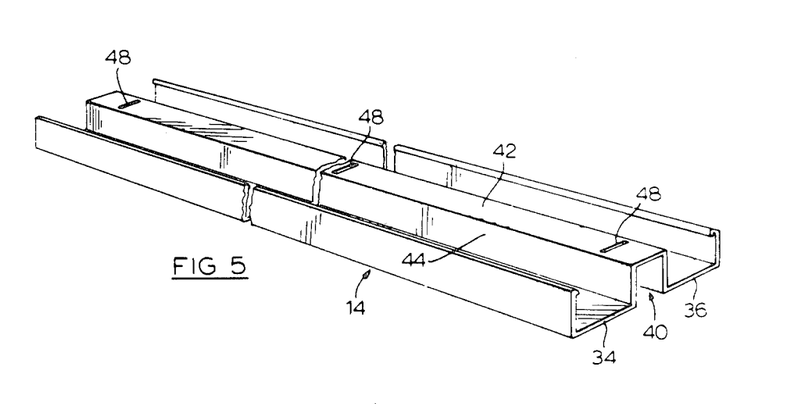
FIG. 5 is a perspective view of another element used in the pallet construction of FIG. 1 or 2.

In FIG. 13, the modified deck-forming member 14 is shown assembled with the modified rectangularly cross-sectioned member 12 of FIG. 12, with the ends of the members 14 overhanging the member 12. Clearly, the modified deck-forming member 14 may be assembled with the rectangularly cross-sectioned member 12 as illustrated in FIG. 4, with the ends of the members 14 lying flush with or overhanging the members 12, by appropriate positioning of the slots 104.

Each of the deck-forming members 14 has a thickness and size allowing limited flexibility when bent about its longitudinal centre line. This flexibility, the dimensioning of the deck-forming members 14 and the set of protrusions 18, the shape of the members 22 and 24 and the dimensioning of the shoulder-engaging members 54 and 56 combine to provide snap-fit means, readily-releasable interlocking of the deck-forming member 14 and the rectangularly cross-sectioned member 12. Further, the interlocking and releasing of the pallet-forming elements 12 and 14 is achievable without the use of special tools or skills.

As seen particularly in FIGS. 6 and 7, the pallet of FIG. 1 and 2 is assembled by, at each intersection of deck-forming 14 and rectangularly cross-sectioned member 12, inserting the longer shoulder-engaging member 54 into the undercut 30 and pushing the shorter shoulder engaging member 56 against the upper and outer surface of the shoulder 38, causing the member 14 to flex slightly about its centre line, thereby moving the shoulder-engaging members 54 and 56 a greater distance apart, so that the curved surface 60 of the shoulder engaging member 56 rides on and round the surface 58 of shoulder 28 and snap-fits into the undercut 32 in engagement with the underside of the shoulder 28.

Disassembly of the interlock is readily achieved by flexing the member 14 about its centre line until the shoulder-engaging members 54 and 56 are spaced apart a distance sufficient to remove the shoulder-engaging member 56 from the undercut 32.

The interaction of the central member or tab 20 and the walls of the slot 48 or of the slot 104 constitutes stop means and prevents longitudinal movement of the member 14, so that a stable pallet construction is provided, and permits release of the members 12 and 14 for pallet disassembly.

In some instances, it may be desired to provide the pallet in a permanent form, in which case the central members or tabs 20 may be twisted or bent over, as seen in the cross-section of FIG. 6, to prevent withdrawal of the tabs 20 through the slots 48.

While the three members of each set of protrusions is illustrated as being provided in a straight line, this construction is for convenience of formation of the extrusion 12. However, the members may be offset from straight line alignment, with the slots 48 being appropriately positioned.

Further, while the sets of protrusions 18 are illustrated as constituted by a central member 20 which is located between left and right hand members 22 and 24 respectively, it is possible to provide the central member 20 integral with the left and right hand members 22 and 24, so that the set of protrusions 18 is constituted by a single protrusion extending generally perpendicular from the surface 13, with shoulders at each longitudinal end defining undercuts with the surface 13.

The latter form of the protrusion 18 has particular utility with the modified form of deck-forming member 14 shown in FIG. 13 and is simpler to form than the three-member sets 18. The continuous protrusion also may be used with the type of deck-forming member 14 shown in FIGS. 3 and 5 by suitable lateral extension of the slot 48 and the formation of appropriate vertical slots in the side walls 44 and 46.

The interlock which is used in the provision of the pallets of the invention and as illustrated above has a variety of other uses, where it is desired to interconnect two elements, one of which has limited flexibility along a line generally transverse to the other extrusion and forms another embodiment of the invention. The use of this interlock in a fence structure is described in more detail below with respect to FIGS. 15 to 18.

It will be seen from the above description of FIGS. 1 to 8 and 12 and 13, that the present invention provides a pallet construction which is in a knock-down form and which is formed from only two types of aluminum members, the members of each type being completely interchangeable one with another. The pallet may be assembled without any special tool or skills.

Turning now to consideration of FIGS. 9 to 11 and 14, there are shown modifications of the two-way pallet constructions of FIGS. 1 and 2 to provide a four-way pallet construction.

Figure 9:
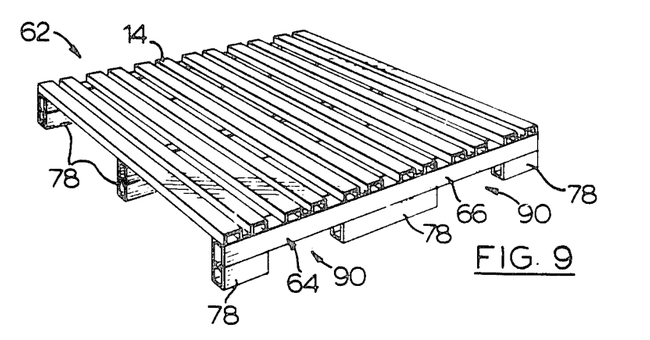
FIG. 9 is a perspective view of a one-deck four-way pallet construction provided in accordance with the invention.
Figure 10:
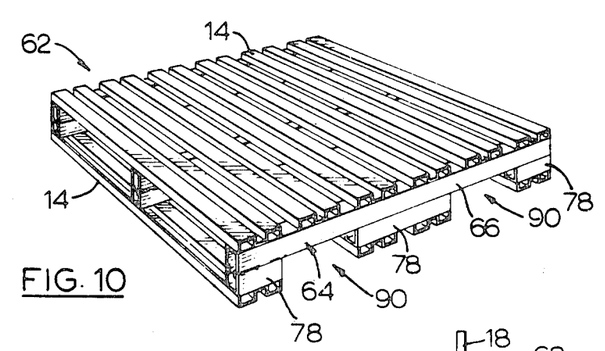
FIG. 10 is a perspective view of a two-deck four-way pallet construction provided in accordance with the invention.

FIGS. 9 and 10 illustrate respectively single-deck and two-deck versions of a four-way pallet 62 having the same deck-forming members 14 as the pallets of FIGS. 1 and 2 releasably connected to elongate members or stringer elements 64 using snap-fit means and stop means in the same manner as described above for the releasable interconnection of the deck-forming members 14 and the stringer elements 12 of the pallets 10 of FIGS. 1 and 2.

As in the case of the pallet of FIGS. 1 and 2, three stringer elements 64 are illustrated in the pallet of FIGS. 9 and 10. Two or four or more such elements 64, however, may be used, depending on the size and strength of pallet desired.

Each of the stringer elements 64 includes a first continuous generally rectangularly-shaped elongate member 66 extending adjacent the upper deck of the pallet 10 for the length thereof.

The continuous elongate member 66 includes a horizontal element having a supporting surface 68 and downwardly depending parallel skirt elements 70 and 72 defining a channel with the horizontal element and opening downwardly. The sets of protrusions 18 extend from the supporting surface 68.

The lower edge of each skirt element 70 and 72 is bent inwardly and is integral with a channel element 74 and 76 respectively, the channels 74 and 76 opening towards the horizontal element and extending the length of the elongate member 66.

Each stringer element 64 also includes three spaced members 78 slidably connected to the elongate member 66. Each of the spaced members 78 includes a horizontal element 80 having a supporting surface from which the set or sets of protrusions 18 extend, such sets of protrusions 18 being absent in the case of the single-deck pallet of FIG. 9 and two upwardly-extending skirt elements 82 and 84 spaced apart the same distance as the skirt elements 70 and 72 and defining a channel with the horizontal element 80 opening upwardly.

The skirt elements 82 and 84 are integral with channel elements 86 and 88 respectively extending inwardly of the skirt elements 82 and 84 and extending the length of the respective spaced member 78.

The channel elements 86 and 88 are constructed to cooperate with the channel elements 74 and 76 respectively to provide an interference fit sliding relationship therebetween, whereby the individual spaced members 78 may be positioned in slidable relation to the elongate member 66.

The skirt members 82 and 84 extend into engagement with the lower edge of the skirt members 70 and 72 respectively to give an appearance of a continuous outer surface of the stringers 64 in the region of the spaced members 78.

Generally, the spaced members 78 are spaced apart equidistantly with one of the members 78 being at each end of the stringer 64 to provide fork lift truck tine-receiving openings 90. This arrangement, however, is for convenience and may be varied as desired, such as by omission of the centre one of the spaced members 78.

The opposed channels defined by the elements of the elongate member 66 and the spaced members 78 provide a generally rectangular cross-section enclosure, of similar dimension to the rectangular cross-section of the stringer elements 12.

Figure 11:
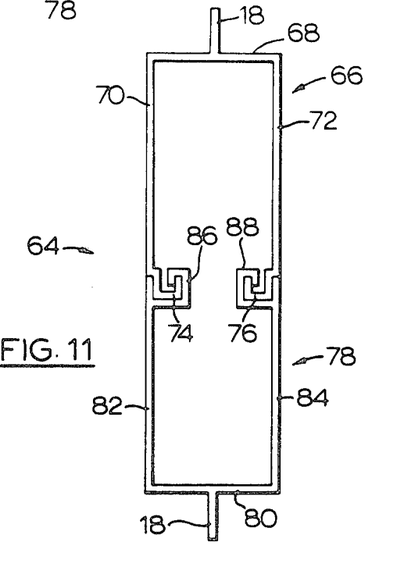
FIG. 11 is an end view of one of the pallet-forming members used in the pallet of FIG. 10.
Figures 12, 13, 14:
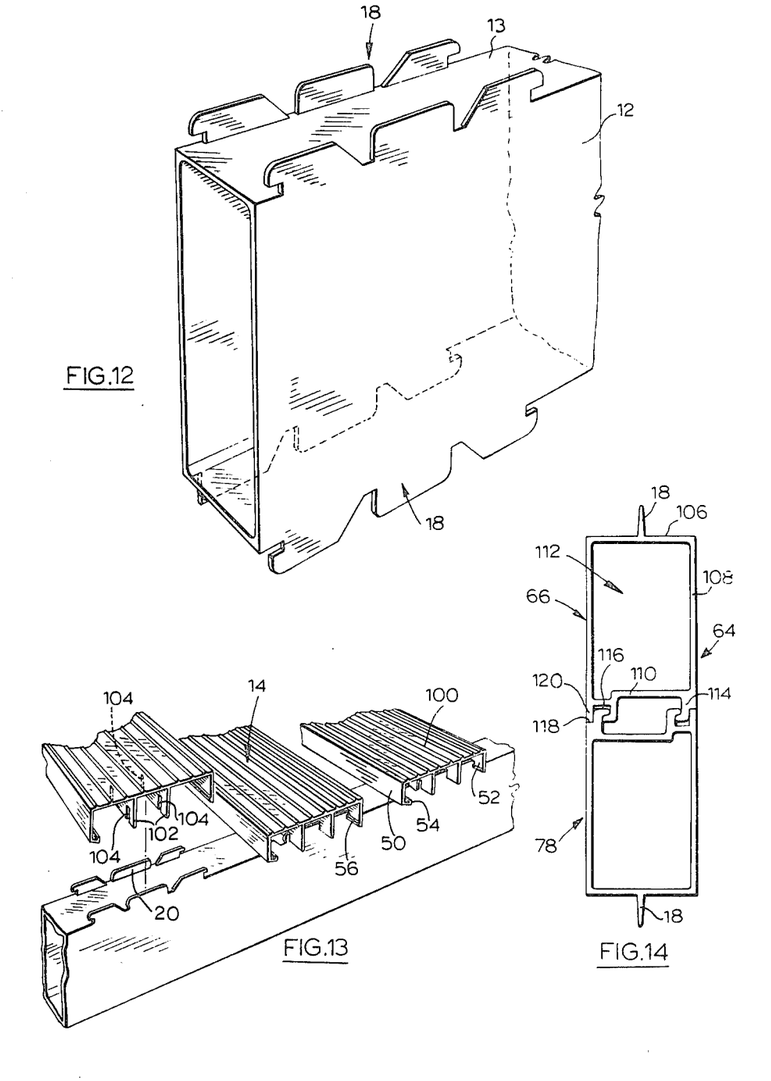
FIG. 12 is a perspective view of the end portion of a modification of the element shown in FIG. 4.
FIG. 13 is a close up of one side of a pallet structure, similar to FIG. 3, showing the interlocking of the pallet-forming members, wherein one of the members is as illustrated in FIG. 12 and the other is a modification of the structure shown in FIG. 5.
FIG. 14 is an end view of modified elements of the four-way pallet illustrated in FIGS. 10 and 11.

FIG. 14 illustrates an alternative form of the stringer elements 64 from that shown in FIG. 11. In the structure of FIG. 14, the stringer elements 64 are formed of identically cross-sectioned members, making formation and assembly simpler.

The continuous elongate member 66 and the spaced members 78 include a supporting surface 106 having protrusions 18 thereon, downwardly depending parallel skirt elements 108 and a cross member 110 defining a generally rectangularly-shaped cavity 112.

While one set of centrally-located protrusions 18 is illustrated, it is possible in this structure and in the structure of FIG. 11 to provide two parallel sets of protrusions, as illustrated in FIG. 12.

A generally L-shaped elongate protrusion 114 is formed at one lateral side of the cross member 110 while an elongate channel 116 is provided at the other lateral side of the cross member 110 shaped to receive the L-shaped protrusion 114 in sliding relation therewith to achieve sliding assembly of the stringer element 64.

As in the case of the structure illustrated in FIG. 11, there is an appearance of a continuous outer surface to the stringers 64 in the region of the spaced members 78. This is achieved by providing a shoulder 118 on the protrusion 114 which is engaged by the outer wall 120 of the elongate channel 116.

As in the case of the embodiments of FIGS. 1 to 8, 12 and 13, the four-way entry pallet construction of FIGS. 9 to 11 and 14 is in a knock-down form and is formed from only the two types of aluminum extrusions, the members of each type being completely interchangeable one with another. The pallet may be assembled and disassembled without any special tools or skills.

The pallet construction of the present invention has a number of advantages over the prior art constructions mentioned above. Since the pallet is provided in a knockdown form and hence may be shipped and stored in compact form, initial shipping cost, storage cost and inventory cost are decreased as compared with wooden and plastic pallets. The user can make up the pallet as and when required, in the type and size required, giving considerable flexibility of choice. Unskilled labor can be used to assemble and disassemble the pallet and no special tools are required for either operation, also providing a cost advantage to the user.

Further, since aluminum is not readily corroded or damaged by exposure to the elements or extremes of temperature, moisture cannot be absorbed, and the dimensions of the pallet remain the same on external exposure, the component parts of the pallet or the made up pallet may be stored exteriorally, further decreasing storage costs. This advantage also contrasts with the prior art wooden and plastic pallets. Since aluminum is inflammable and spark proof, no fire or safety hazard is attendant the use or storage of the pallets, also in contrast to the wooden and plastic pallets.

Broken or damaged pallets have considerable scrap value as aluminum metal and hance are 100% recyclable, thereby avoiding the considerable disposal problems and disposal costs of wooden and plastic pallets. Further, since the various elements are of only two types and the members of each type are wholly interchangeable, it is unlikely that the pallet would be damaged to the extent that the whole pallet would require replacing. Repair to one or more damaged parts is readily achieved by substituting a new part for the damaged part, thereby prolonging the overall effective life of the pallet. This advantage also contrasts markedly with the wooden and plastic pallets which usually have to be disposed of in their entirety.

A corrosion resistant finish may be provided to the aluminum surface, typically by anodizing when the pallet is to be used where high corrosion materials occur. Further, a highly resistant colour coating may be applied inexpensively to the aluminum, to provide color-keying for various uses, if desired. These treatments are not feasible with wooden pallets, as mentioned above.

Since the aluminum pallets of the invention do not promote fungal or bacterial growth, are very easily cleaned and sterilized, generally are non-corrodable and can be easily provided with corrosion-resistant finishes for specialist corrosion problems, are not affected by extremes of temperature, do not split or crack, or use nails, screws or other separable fasteners, are not affected by ultraviolet rays, and are light in weight, the pallets have a wide flexibility of use and may be used in many industries, including industries where wooden and plastic pallets can be used only with difficulty, or not at all.

Industries where wooden and plastic pallets can be used only with difficulty or not at all and in which the pallets of the present invention may be used include meat processing plants, dairy plants, canning factories, any any food processing plant where cleanliness and health factors are essential, pharmaceutical industries, chemical industries with corrosion problems, chemical industries with explosive and fire hazards, petrochemical industries, industries where exposure to high moisture levels or liquids is frequent and warehousing or storage under refrigeration.

Further, the pallets may be used for outside storage with exposure to extreme weather conditions, in transportation industries where pallet weight is a factor, such as shipment by air cargo, in any processing or storage facility where contamination of pallets is a problem, in material handling in the Arctic region or under other extensive cold weather conditions in material handling at elevated temperatures, and in various military and emergency uses.

Turning now to the fence structure illustrated in FIGS. 15 to 18, this structure is formed by elements which embody the principles outlined above in connection with pallet construction. The component parts are preferably formed of aluminum.

Figures 15, 16:
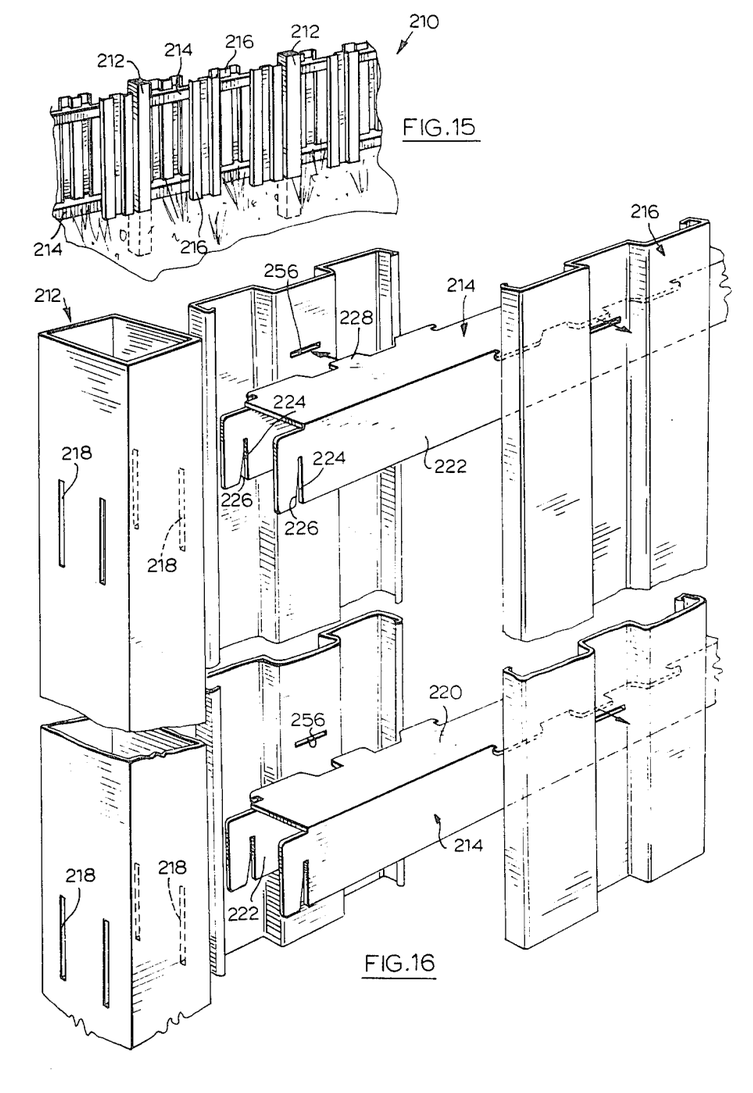
FIG. 15 is a perspective view of a fence structure in accordance with this invention.
FIG. 16 is a close-up, exploded view of the fence structure of FIG. 15.

A fence structure 210 includes vertical post members 212 which are spaced apart at desired locations and are secured in the ground, vertically-spaced horizontal rail members 214 extending between and connected to pairs of post members 212 and vertically aligned fence plank or picket members 216 extending between and secured to the rail members 214. Additional rail members 214 may be provided, if desired.

While the plank members 216 are illustrated as being positioned on opposite sides of the rail members 214 in diagonal relation, this structure is only one of several possibilities. For example, all the plank members 216 may be provided on one or the other side of the rail members 214, or plank members 216 may be provided on both sides of the rail members 214 in alignment with each other.

Each of the post members 212 is hollow and has a generally rectangular cross-section. The upper end may be provided with a cap, if desired. Pairs of horizontally spaced vertical slits 218 are provided adjacent the top and bottom of each post 212 for receiving ends of the rail members 214.

Each of the rail members 214 consists of an upper horizontal planar portion 220 and vertical depending skirts 222 which are integral with the upper planar portion 220. The skirts 222 extend beyond the longitudinal extremity of the planar portion 220 and are dimensioned in this region to enter the slits 218.

Vertical slits 224 are formed in the skirts 222 adjacent the inboard extremity of the extension of the skirts 222 to allow releasable locking of the rail members 214 with the posts 212 by sliding the end of the rail members 214, after passage through the slits 218, downwardly so that the wall of the post enters the slits 224. The slits 224 are provided with a slight outward taper 226 at the lower end to facilitate entry of the post wall into the slits 224.

Figure 18:
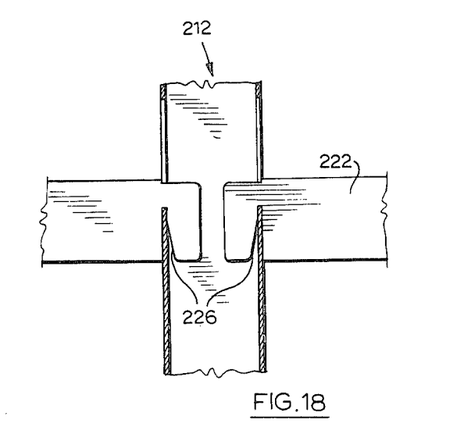

When the rail members 214 are assembled with the posts 212, the lateral extremities of the planar portion 220 lie very close to or abutting the outer wall of the posts 212, as may be seen in particular from the detail of FIG. 18.

If desired, a lower integral planar portion may be provided for each rail member 214 to provide an enclosed structure.

Extending horizontally from each lateral side of the planar portion 220 are sets of protrusions 228. The sets of protrusions 228 are provided at the illustrated location on the rail members 214 for ease of manufacture. If desired, however, the protrusions 228 may be provided extending from the skirts 222 at some location in their height. The sets of protrusions 228 may be in the form of a single continuous protrusion, as described above, with suitable modification to the plank members 216 being made.

The number of the sets of protrusions 228 is equal to the number of plank members 216 to be attached to the rail members 214. The spacing apart of the sets of protrusions 228 from each other may vary widely, depending on the spacing and configuration desired for the plank members 216 in the fence 210.

Each of the sets of protrusions 228 includes a central member 230, a left hand members 232 and a right hand member 234. Each member of the set 228 extends horizontally generally coplanar to the planar portion 220 and extends in straight line alignment with the other members of the set and with the members in other sets on that side of the planar portion 220. Each member is thin laterally.

The left and right hand members 232 and 234, which have mirror-image shapes, are undercut at their ends remote from the central member 228 to define shoulders 236 and 238 respectively and undercuts 240 and 242 respectively.

Each of the plank or picket members 216 includes first and second elongate parallel coplanar elements 244 and 246. The coplanar elements 244 and 246 are joined by an integral member defining a channel 248 therebetween and including a first elongate portion 250 situated in a plane parallel to the plane of the coplanar elements 244 and 246 and intended to engage the outer surface of the skirt 222 and first and second upright elements 252 and 254 ingegrally joining the elongate portion 250 and the coplanar elements 244 and 246.

The elongate portion 250 has slots 256 formed therethrough of length and dimension sufficient to receive the central member or tab 230 of each set of protrusions therethrough. The slots 256 are used corresponding to the two rail members 214.

The plank elements 216 also include integral skirt portions 258 and 260 depending from the coplanar elements 244 and 246 generally perpendicularly thereto at the sides of the plank elements 216. The skirt portions 258 and 260 extend a distance substantially equal to the depth of the channel 248. At the lower end of each skirt portion 258 and 260 is a shoulder-engaging member 262 and 264 respectively.

Each shoulder-engaging member includes a portion projecting inwardly of the skirt 258 and 260 towards the elongate portion 250 and a shoulder-face-engaging portion. Generally shoulder-engaging member 262 projects inwardly in greater distance than shoulder-engaging member 264 and a distance substantially equal to the depth of the undercut 240.

Figure 17:
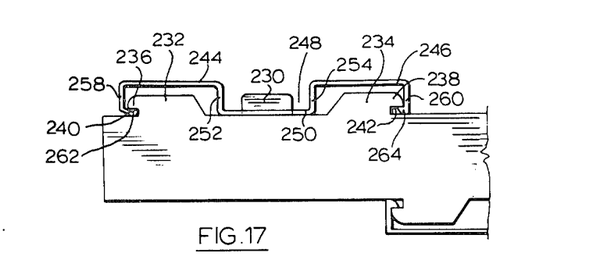
FIGS. 17 and 18 are details of parts of the fence structure of FIG. 15.

While the undercuts 240 and 242 have the same dimensions and depth approximately equal to the extremity of the shoulder-engaging member 262, this arrangement is for convenience in assembly of the fence, allowing the longer shoulder-engaging member 262 to be inserted in either undercut to engage both the shoulder and the end wall of the undercut, so that the arrangement shown in FIG. 17 with respect to the relative positions of shoulder-engaging members 262 and 264 and undercuts 240 and 242 may be reversed.

However, if desired, the undercuts 240 and 242 may be dimensioned such that undercut 240 has a depth at least equal to the maximum distance of extension of the shoulder-engaging member 262 and the undercut 242 has a lower depth at least equal to the maximum distance of extension of the shoulder-engaging member 262 and less than the maximum distance of extension of the shoulder-engaging member 264.

Each shoulder 236 and 238 has a sloping outer surface. The surface of the shoulder-engaging member 264 intended to engage the sloping surface during assembly, as described below, is also curved.

Each of the plank members 216 has a thickness and size allowing limited flexibility when bent about its longitudinal centre line. This flexibility, the dimensioning of the plank members 216 and the set of protrusions 228, the shape of the members 232 and 234 and the dimensioning of the shoulder-engaging members 262 and 264 combine to provide snap-fit means, readily releasable interlocking of the plank members 216 and the rail members 214. Further, the interlocking and releasing of the fence elements 214 and 216 is achievable without the use of special tools or skills.

The fence is assembled by inserting the rail members 214 into the posts 212 and then, at each intersection of plank member 216 and rail member 214, inserting the longer shoulder-engaging member 262 into the undercut 240 and pushing the shorter shoulder engaging member 264 against the upper and outer surface of the shoulder 238, causing the member 216 to flex slightly about its centre line, thereby moving the shoulder-engaging members 262 and 264 a greater distance apart, so that the curved surface of the shoulder-engaging member 264 rides on and round the surface of shoulder 238 and snap-fits into the undercut 242 in engagement with the underside of the shoulder 238, to achieve the assembly shown in FIG. 17.

Disassembly of the interlock is readily achieved by flexing the member 216 about its centre line until the shoulder-engaging members 262 and 264 are spaced apart a distance sufficient to remove the shoulder-engaging member 264 from the undercut 242.

The interaction of the central member or tab 230 and the walls of the slot 256 constitutes stop means and prevents longitudinal movement of the member 216, so that a stable fence construction is provided, but normally permits release of the members 214 and 216 for fence disassembly.

In some instances it may be desired to provide the fence in a permanent form, in which case the central members or tabs 230 may be twisted or bent over to prevent withdrawal of the tabs 230 through the slots 256.

In an alternative arrangement, the planks 216 may have a wholly planar outer surface and be constructed in analogous manner to the modified deck-forming member shown in FIG. 13.

A fence constructed in accordance with this invention is readily and rapidly assembled without the need for any special tooling. In the event of one or more parts being damaged, its replacement may be achieved simply and inexpensively without the necessity of replacing other components. The fence is durable and maintenance free.

The compact nature of the components parts of the fence allow non-bulky shipping and storage of the fence-forming components.

An alternative form of fence structure also may be provided having horizontally-positioned vertically-spaced plank members 216 extending between and secured to the post members 212. In this embodiment, the protrusions 228 are formed in a vertical line on the front face of the post members 212.

The plank members 216 may extend across and be attached to a plurality of post members 212, if desired. All the plank members 216 may be provided on one side of the posts, on both sides of the posts in alignment, or on both sides of the posts in diagonally displaced manner.

SUMMARY

The present invention, therefore, provides pallet construction and fence structures which are formed of readily-assembled and replaced parts. Modifications are possible within the scope of the invention.

What I claim is:

1. A fence comprising:
   at least two horizontally-spaced vertical aluminum support posts,
   at least upper and lower vertically-spaced aluminum rail members extending generally horizontally between and secured to said posts, and
   a plurality of vertically-extending aluminum plank members horizontally-spaced from each other and contacting and extending at least between said upper and lower rail members,
   snap fit means releasably interconnecting said rail members with each of said plank members at the intersections thereof,
   at each said intersection, said snap-fit means including a first part integral with said rail member and a second part integral with said plank member, and
   stop means located at each said intersection and preventing movement of each of said plurality of plank members longitudinally thereof and transverse to said rail members while normally permitting movement of said plank members out of contact with said rail members upon release of said snap-fit means to allow disassembly of the fence,
   said stop means at each said intersection including cooperating elements integral with said plank member and integral with said rail member,
   each of said rail members including a horizontally-extending planar portion and skirt portions integral with said planar portion depending therefrom,
   each of said plank members including first and second coplanar portions spaced from said rail members at said intersections and a third planar portion engaging one of said skirt portions of said rail member at their intersection and extending in parallel relation to said first and second coplanar portions,
   first and second wall portions integrally joining one side of said third planar portion to one side of one of said coplanar portions and the other side of said third planar portion to one side of the other of said coplanar portions, whereby said wall portions and said third planar portion define a first channel opening in a direction away from said rail members, and first and second parallel skirt portions integrally joined to the other sides of said coplanar portions and extending a distance substantially equal to the height of said wall portions, whereby said skirt portions and wall portions define second and third channels with said coplanar portions opening towards said rail members, and said snap fit means at each said intersection comprising first and second protrusions extending horizontally from said rail member and each including a shoulder projecting in opposite directions generally parallel to and spaced from said skirt portion to define an undercut therewith, said first and second protrusions constituting said first part of said snap fit means integral with said rail members and first and second integral projections formed at the free edge of said skirt portions of said plank members and projecting towards each other and into said undercuts at said intersections, said integral projections constituting said second part of said snap fit means integral with said plank members, the extremities of said shoulders being spaced apart substantially the distance between said skirt portions of said plank members.

2. The fence of claim 1 wherein each of said posts is hollow and has a generally rectangular cross section.

3. The fence of claim 2 wherein said securement of each of said rail members to said posts is achieved by a pair of horizontally-spaced vertical slits formed in one wall of each of said posts, horizontally-spaced vertical tabs passing through said vertical slits and further vertical slits formed in said tabs receiving portions of said one wall therein.

4. The fence of claim 1 wherein said snap fit means at each said intersection includes spaced channels situated on said rail members and opening in opposite horizontal directions and channel-engaging members formed on each of said plank members constructed to snap fit into said spaced channels.

5. The fence of claim 1 wherein said stop means at each said intersection comprises a projection on said rail member engaging an opening in said plank member.

6. The fence construction of claim 1 wherein, in profile, each of said shoulders has a generally straight edge at the side thereof adjacent to said planar portion and a curved edge at the opposite side thereof tapering to the outer extremity thereof and the other of said projections has a curved surface positioned to engage said curved edge of the adjacent shoulder during assembly of said fence.

7. The fence construction of claim 1 wherein said stop means at each said intersection comprises a third protrusion extending horizontally from said rail member and located between said first and second protrusions, said third protrusion constituting one of said cooperating elements of said stop means and an opening formed through said third planar portion receiving said third protrusion therethrough, said opening constituting the other cooperating element of said stop means.

8. The fence construction of claim 7 wherein said third protrusion is thin and extends generally longitudinally of said skirt portion and said opening is in the form of a slit extending generally transverse of said third planar portion and dimensioned to receive said protrusion therethrough with minimum clearance.

9. The fence construction of claim 8 wherein said first, second and third protrusions are in straight line alignment with each other and with the other first, second and third protrusions projecting from said skirt portion.

10. The fence construction of claim 8 wherein said first, second and third protrusions are constituted by a single continuous elongate projection having said shoulders located one at each end thereof.

11. A fence structure comprising:

at least two horizontally-spaced vertical aluminum support posts, a plurality of horizontally-extending aluminum plank members contacting and extending at least between the at least two support posts in vertically-spaced apart relation, snap fit means releasably interconnecting said plank members with said posts at the intersections thereof, at each said intersection, said snap-fit means including a first part integral with said plank member and a second part integral with said post, and stop means located at each said intersection and preventing movement of each of said plurality of plank members longitudinally thereof and transverse to said posts while normally permitting movement of said plank members out of contact with said posts upon release of said snap fit means to allow disassembly of the fence, said stop means at each said intersection including cooperating elements integral with said plank member and integral with said post, each of said posts is hollow and has a generally rectangular cross section, and has front faces and side faces, each of said plank members includes first and second coplanar portions spaced from said posts at said intersections and a third planar portion engaging one front face of said post at their intersection and extending in parallel relation to said first and second coplanar portion first and second wall portions integrally joining one side of said third planar portion to one side of one of said coplanar portions and the other side of said third planar portion to one side of the other of said coplanar portions, whereby said wall portions and said third planar portion define a first channel opening in a direction away from said posts, and first and second parallel skirt portions integrally joined to the other sides of said coplanar portions and extending a distance substantially equal to the height of said wall portions whereby said skirt portions and wall portions define second and third channels with said coplanar portions opening towards said posts, and said snap fit means at each said intersection comprises first and second protrusions extending from said front face and each including a shoulder projecting in opposite directions generally parallel to and spaced from said front face to define an undercut thereof, said first and second protrusions constituting said first part of said snap fit means integral with said posts, and first and second integral projections formed at the free edge of said skirt portions and projecting towards each other and into said undercuts at said intersections, and integral projections constituting said second part of said snap fit means integral with said plank members, the extremities of said shoulders being spaced apart substantially the distance between the skirt portions of said plank members.

12. The fence of claim 11 wherein, in profile, each of said shoulders has a generally straight edge at the side thereof adjacent to said front face and a curved edge at the opposite side thereof tapering to the outer extremity thereof and the other of said projections has a curved surface positioned to engage said curved edge of the adjacent shoulder during assembly of said fence.

13. The fence construction of claim 11, wherein said stop means at each said intersection comprises a third protrusion extending horizontally from said front face and located between said first and second protrusions, said third protrusion constituting one of said cooperating elements of said stop means and an opening formed through said third planar portion receiving said third protrusion therethrough, said opening constituting the other cooperating element of said stop means.

14. The fence construction of claim 13 wherein said third protrusion is thin and extends generally longitudinally of said front face and said opening is in the form of a slit extending generally transverse of said third planar portion and dimensioned to receive said protrusion therethrough with minimum clearance.

15. The fence construction of claim 14 wherein said first, second and third protrusions are in straight line alignment with each other and with the first, second and third protrusions projecting from said front face.

16. The fence construction of claim 14 wherein said first, second and third protrusions are constituted by a single continuous elongate projection having said shoulders located one at each end thereof.

17. A fence structure comprising:

at least two horizontally-spaced vertical aluminum support posts, a plurality of horizontally-extending aluminum plank members contacting and extending at least between the at least two support posts in vertically-spaced apart relation, snap fit means releasably interconnecting said plank members with said posts at the intersections thereof, at each said intersection, said snap-fit means including a first part integral with said plank member and a second part integral with said post, and stop means located at each said intersection and preventing movement of each of said plurality of plank members longitudinally thereof and transverse to said posts while normally permitting movement of said plank members out of contact with said posts upon release of said snap fit means to allow disassembly of the fence, said stop means at each said intersection including cooperating elements integral with said plank member and integral with said post, said snap fit means at each said intersection including spaced channels situated on said posts and opening in opposite vertical directions and channel-engaging members formed on each of said plank members constructed to snap fit into said spaced channels.

18. The fence of claim 17 wherein said stop means at each said intersection comprises a projection on said post engaging an opening in said plank member.